United States Patent Office 3,053,818
Patented Sept. 11, 1962

3,053,818
TRIFLUOROCHLOROETHYLENE INTERPOLYMERS
Francis J. Honn, Westfield, N.J., and John M. Hoyt, Woodside, N.Y., assignors, by mesne assignments, to Minnesota Mining and Manufacturing Company, St. Paul, Minn., a corporation of Delaware
No Drawing. Filed July 31, 1956, Ser. No. 601,117
17 Claims. (Cl. 260—80.5)

This invention relates to halogen-containing polymeric compositions, and more particularly to trifluorochloroethylene interpolymers. The invention has as an object new and useful compositions of matter. Another object of the invention is valuable interpolymeric compositions comprising trifluorochloroethylene. A still further object of the invention, resides in a process for obtaining these interpolymeric compositions in good yields. Other objects and advantages inherent in the invention will become apparent to those skilled in the art from the accompanying description and disclosure.

In accordance with the present invention, the interpolymeric compositions are produced by interpolymerizing trifluorochloroethylene, vinylidene fluoride and another fluoroolefin, under the conditions as more fully hereinafter described. Examples of the other fluoroolefin which is interpolymerized with the trifluorochloroethylene and the vinylidene fluoride monomers are vinyl fluoride, 1,1-chlorofluoroethylene, 4,6,7 - trichloroperfluoroheptene-1, trifluoroethylene, perfluoropropene, perfluoroisobutene, tetrafluoroethylene, 2-chloropentafluoropropene, bromotrifluoroethylene, perfluorocyclobutene and 1,1,1,4,4,4-hexafluorobutene-2. The interpolymers thus produced are valuable macromolecules and are adaptable to a wide variety of commercial uses. They are chemically and physically stable, resistant to oil and hydrocarbon fuels, selectively soluble in various commercial solvents and can be molded by conventional techniques to yield a wide variety of useful articles. They also serve as durable, flexible, protective coatings on surfaces which are subjected to environmental conditions in which they may come into contact with various corrosive substances, such as oils, fuels and strong chemical reagents.

The interpolymers of the present invention are produced from monomeric mixtures comprising trifluorochloroethylene, vinylidene fluoride and another fluoroolefin, such as described above, in which the trifluorochloroethylene and the vinylidene fluoride monomers are each present in an amount of at least 15 mole percent and the other fluoroolefin monomer is present in an amount of at least 5 mole percent. The most useful interpolymers of the present invention are produced from monomeric mixtures comprising the trifluorochloroethylene monomer present in an amount of at least 30 mole percent, the vinylidene monomer present in an amount of at least 30 mole percent and the other fluoroolefin monomer present in an amount of at least 10 mole percent.

The interpolymers of the present invention are preferably prepared by carrying out the polymerization reaction in the presence of a free-radical promoter. For this purpose, the polymerization reaction is carried out by employing a water-soluble peroxy type initiator in a water-suspension type recipe or an organic peroxide initiator in a bulk-type system. The water-suspension type recipe system is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is often desirable to employ an emulsifying agent. This emulsifying agent is present either in the form of a metallic salt of an aliphatic acid having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

The polymerization reaction is preferably conducted under alkaline conditions. It is desirable, therefore, that the pH be maintained between about 7 and 11 in order to prevent gelling of the resulting polymeric product, a condition which often causes slowdown or stoppage of the polymerization reaction. In this respect, it should be noted that it is sometimes necessary to maintain the pH of the system within the aforementioned pH limits by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, trichloroacetyl peroxide, 2,4-dichlorobenzoyl peroxide and dichloroacetyl peroxide, benzoyl peroxide and di-tertiary butyl peroxide.

The polymerization reaction is carried out, in general, at a temperature between about −30° C. and about 150° C. When the polymerization reaction is carried out employing a water-suspension type recipe, temperatures between about 0° C. and about 75° C. are preferably employed. When the polymerization reaction is carried out in the presence of an organic peroxide initiator in a bulk-type polymerization system, temperatures over the entire range of between about −30° C. and about 150° C. are employed, and preferably between about −30° C. and about 20° C., depending upon the decomposition temperature of the promoter. The polymerization reactions described herein to produce the polymeric compositions of the present invention are carried out under autogenous conditions of pressure.

As previously indicated, the interpolymers of the present invention are particularly suitable and useful for the fabrication of a wide variety of materials having highly desirable physical and chemical properties. In this respect, the interpolymers of the present invention possess important utility in the fabrication of resilient gaskets, seals, valve-diaphragms, films and various other commercial applications. Another important use of the interpolymers of the present invention is in the form of durable, flexible, protective coatings on surfaces which are subjected to distortion in normal use, e.g., fabric surfaces. For these purposes, the interpolymers of the present invention may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting, unduly, the overall yield. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$), bromotrichloromethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following examples are offered for a better understanding in producing the interpolymeric compositions of the present invention and are not to be construed as limiting its scope.

*Example I*

A stainless steel reaction vessel was flushed with nitrogen and then charged with 60 ml. of deionized water and 10 ml. of an aqueous solution containing 2.0 grams of sodium metabisulfite in 100 ml. of solution. The contents of the vessel were then frozen, and the vessel was next charged with 20 ml. of an aqueous solution containing 2.5 grams of ammonium persulfate dissolved in 100 ml. of water. The contents of the vessel were next refrozen, and there was then charged to the vessel 10 ml. of an aqueous solution containing 0.5 gram of

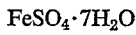

in 100 ml. of solution. The vessel was connected to a vacuum-transfer system and evacuated at liquid nitrogen temperature. To the frozen contents of the vessel were added, by distillation, 11.5 grams of trifluorochloroethylene, 27.5 grams of vinylidene fluoride, and 10.7 grams of 1,1-chlorofluoroethylene, to make-up a total monomer charge containing 15 mole percent trifluorochloroethylene, 65 mole percent vinylidene fluoride and 20 mole percent 1,1-chlorofluoroethylene. After the contents of the reaction vessel had been refrozen at liquid nitrogen temperature, the vessel was evacuated and rocked at room temperature for a period of 5 hours. At the end of this time, the product was collected, washed with hot water and dried to constant weight in vacuo at 35° C. A rubbery interpolymeric product of trifluorochloroethylene, vinylidene fluoride and 1,1-chlorofluoroethylene was obtained in an amount corresponding to an 86% conversion.

A sample of the raw interpolymer was compression molded at 300° F. for approximately 10 minutes. After molding, the sample was firm, flexible and retained its rubbery characteristics. A volume increase of 20% was observed in the molded sample when tested by ASTM designation, D–471–49–T, in ASTM type II fuel, consisting of isooctane (60% by volume), benzene (5% by volume), toluene (20% by volume) and xylene (15% by volume). Gehman stiffness of the molded sample of raw interpolymer, determined according to ASTM designation D–1053–49–T, was as follows: $T_2$=8.5° C.; $T_5$=−1.5° C.; $T_{10}$=−6.5° C.; $T_{100}$=−21.0° C.

*Example II*

A 20 ml. heavy-walled glass polymerization tube was flushed with nitrogen and charged with 6 ml. of deionized water and 2 ml. of an aqueous solution containing 2.0 grams of sodium metabisulfite in 100 ml. of solution. The contents of the tube were frozen and the tube was then charged with 2.0 ml. of an aqueous solution containing 2.5 grams of ammonium persulfate in 100 ml. of solution and 1.0 ml. of an aqueous solution containing 0.5 gram of $FeSO_4·7H_2O$ in 100 ml. of solution. The tube was connected to a vacuum-transfer system and evacuated at liquid nitrogen temperature. To the frozen contents of the tube were added, by flash distillation, 2.63 grams of trifluorochloroethylene, 1.44 grams of vinylidene fluoride and 0.93 gram of trifluoroethylene to make-up a total monomer charge containing 40 mole percent trifluorochloroethylene, 40 mole percent vinylidene fluoride and 20 mole percent trifluoroethylene.

The polymerization reaction was carried out at a temperature of 18° C. for a period of 24 hours. The tube was then frozen, opened and the rubbery interpolymeric product was removed, washed with hot water and dried to constant weight in vacuo at 35° C. The product was obtained in an amount corresponding to a 100% conversion.

*Example III*

Employing the same general procedure set forth in Example I and the same polymerization recipe, a 300-ml. heavy polymerization tube was charged with 22.8 grams of trifluorochloroethylene, 12.5 grams of vinylidene fluoride and 14.7 grams of perfluoropropene to make-up a total monomer charge containing 40 mole percent trifluorochloroethylene, 40 mole percent vinylidene fluoride and 20 mole percent perfluoropropene. The polymerization reaction was carried out by tumbling the tube at a temperature of approximately 20° C. for a period of 14 hours in a temperature-regulated water-bath. The resulting polymerization product was worked-up in accordance with the same procedure as set forth in Example I. A rubbery interpolymeric product of trifluorochloroethylene, vinylidene fluoride and perfluoropropene was obtained in an amount corresponding to an 80% conversion. An 0.5 gram sample of the interpolymeric product was entirely soluble in 12 ml. of acetone. The product was found, by chemical analysis, to contain 17.2% chlorine and 56.7% fluorine, which corresponds to a composition containing 49 mole percent trifluorochloroethylene, 38 mole percent vinylidene fluoride and 13 mole percent perfluoropropene.

*Example IV*

Employing the procedure set forth in Example II and the same polymerization recipe, the polymerization tube was charged with 2.07 grams of trifluorochloroethylene, 1.14 grams of vinylidene fluoride and 1.7 grams of perfluoroisobutene to make-up a total monomer charge containing 40 mole percent trifluorochloroethylene, 40 mole percent vinylidene fluoride and 20 mole percent perfluoroisobutene.

The polymerization reaction was carried out at a temperature of approximately 20° C. for a period of 24 hours.

The resulting polymerization product was worked-up in accordance with the same procedure as set forth in Example I. A rubbery interpolymeric product of trifluorochloroethylene, vinylidene fluoride and perfluoroisobutene was obtained in an amount corresponding to a 63% conversion. The product was found, by chemical analysis, to contain 19.28% chlorine and 33.8% fluorine, which corresponds to a composition comprising 52 mole percent trifluorochloroethylene, 44 mole percent vinylidene fluoride and 4 mole percent perfluoroisobutene.

A sample of the raw interpolymer was compression molded at 250° F. for approximately 10 minutes. After molding, the sample remained firm, flexible and rubbery. A volume increase of 22% was observed in the molded sample when tested in ASTM type II fuel. Gehman stiffness of the molded sample of raw interpolymer was as follows: $T_2=3.5°$ C.; $T_5=2.0°$ C.; $T_{10}=1.5°$ C.; $T_{100}=-2°$ C.

*Example V*

Employing the procedure set forth in Example II and the same polymerization recipe, the polymerization tube was charged with 2.52 grams of trifluorochloroethylene, 1.39 grams of vinylidene fluoride and 1.08 grams of tetrafluoroethylene to make-up a total monomer charge containing 40 mole percent trifluorochloroethylene, 40 mole percent vinylidene fluoride and 20 mole percent tetrafluoroethylene.

The polymerization reaction was carried out at a temperature of approximately 20° C. for a period of 5 hours. The resulting polymerization product was worked-up in accordance with the same procedure as set forth in Example II. A rubbery interpolymeric product of trifluorochloroethylene, vinylidene fluoride and tetrafluoroethylene was obtained in an amount corresponding to a 23% conversion. The product was found, on chemical analysis, to contain 16.19% chlorine and 56.88% fluorine, which corresponds to a composition comprising 42 mole percent trifluorochloroethylene, 41 mole percent vinylidene fluoride and 17 mole percent tetrafluoroethylene. A sample of the raw interpolymer was compression molded at 425° F. for approximately 10 minutes. A volume increase of 14% was observed in the molded sample when tested in ASTM type II fuel.

*Example VI*

Employing the procedure set forth in Example II and the same polymerization recipe, the polymerization tube was charged with 2.21 grams of trifluorochloroethylene, 1.21 grams of vinylidene fluoride and 1.58 grams of 2-chloropentafluoropropene to make-up a total monomer charge containing 40 mole percent trifluorochloroethylene, 40 mole percent vinylidene fluoride and 20 mole percent of 2-chloropentafluoropropene.

The polymerization reaction was carried out at a temperature of approximately 20° C. for a period of 69 hours. The resulting polymerization product was worked-up in accordance with the same procedure as set forth in Example II. A rubbery interpolymeric product of trifluorochloroethylene, vinylidene fluoride and 2-chloropentafluoropropene was obtained in an amount corresponding to a 78% conversion. A sample of the raw interpolymer was compression molded at 325° F. for a period of approximately 10 minutes. After molding, the sample remained soft, flexible and retained its rubbery characteristics. A volume increase of 25% was observed in the molded sample in ASTM type II fuel.

*Example VII*

Employing the procedure set forth in Example II and the same polymerization recipe, the polymerization tube was charged with 2.23 grams of trifluorochloroethylene, 1.23 grams of vinylidene fluoride and 1.54 grams of bromotrifluoroethylene to make-up a total monomer charge containing 40 mole percent trifluorochloroethylene, 40 mole percent vinylidene fluoride and 20 mole percent bromotrifluoroethylene.

The polymerization reaction was carried out at a temperature of approximately 20° C. for a period of 24 hours. The resulting polymerization product was worked-up in accordance with the same procedure as set forth in Example II. A tough, rubbery interpolymeric product of trifluorochloroethylene, vinylidene fluoride and bromotrifluoroethylene was obtained in an amount corresponding to a 100% conversion.

*Example VIII*

A heavy-walled glass polymerization tube was flushed with nitrogen and then charged with 4 ml. of a solution prepared by dissolving 0.75 gram of potassium persulfate in 80 ml. of water. The contents of the tube were then frozen, and to the frozen contents of the tube was next charged 1 ml. of a solution containing 0.4 gram of sodium metabisulfite in 20 ml. of water. The contents of the tube were then refrozen. To the frozen contents of the tube was next added 5 ml. of a solution prepared by dissolving 1 gram of the ammonium salt of $C_8$-telomer acid, $CF_2Cl(CFClCF_2)_3COOH$, dissolved in 100 ml. of water. The solution had been adjusted with aqueous potassium hydroxide to a pH of 7. The tube was then connected to a gas-transfer system and evacuated at liquid nitrogen temperature. To the frozen contents of the tube were added, by distillation, 1.54 grams of trifluorochloroethylene, 1.69 grams of vinylidene fluoride and 1.77 grams of 4,6,7-trichloroperfluoroheptene-1, to make-up a total monomer charge containing 30 mole percent trifluorochloroethylene, 60 mole percent vinylidene fluoride and 10 mole percent 4,6,7-trichloroperfluoroheptene-1.

The polymerization tube was then sealed and rotated end-over-end in a temperature-regulated water-bath at approximately 20° C. for a period of 24 hours. At the end of this time, the contents of the tube were coagulated by freezing at liquid nitrogen temperature. The coagulated product was then collected, washed with hot water, and dried to constant weight in vacuo at 35° C. A rubbery interpolymeric product of trifluorochloroethylene, vinylidene fluoride and 4,6,7-trichloroperfluoroheptene-1 was obtained in an amount corresponding to a 12% conversion.

As previously indicated, the interpolymeric compositions of the present invention possess highly desirable physical and chemical properties which make them useful for fabrication of a wide variety of thermoplastic articles, or for the application to various surfaces as protective coatings. In such uses, the raw elastomeric copolymer, such as is produced in accordance with the procedure set forth in the above examples, is extruded or pressed into sheets at temperatures between about 200° F. and about 650° F. and at a pressure between about 500 and about 15,000 pounds per square inch for a period of about 1 to about 10 minutes. Thereafter, various articles can be molded from preforms cut from sheets and extruded stock in the form of gaskets, diaphragms, packings, etc. In this respect, it is preferred in such applications, that the raw copolymer also includes various vulcanizing agents and fillers. The presence of the aforementioned other fluoroolefin in the finished interpolymer, facilitates the ease of cross-linking or vulcanization to a degree not otherwise obtainable if only the copolymer of trifluorochloroethylene and vinylidene fluoride were to be processed.

When employed as protective coatings on any of the surfaces previously described, the raw interpolymeric composition is dissolved in any of the aforementioned solvents and is applied to the desired surfaces, employing such apparatus as a knife-spreader or a doctor-blade or a reverse-roll coater. The solvent, after the interpolymeric coating composition has been applied to the surface, is permitted to evaporate. This may also be accomplished in the presence of elevated temperatures, if so desired.

In many applications, it is desirable to include in the interpolymeric coating compositions, various vulcanizing agents. In the latter case, supplementary heat-treatment of the coating is required, either during the solvent-removal step or thereafter. After the solvent has been completely evaporated, and after the vulcanization step, if included, has been completed, the coated surface is ready for use. In this respect, it should be noted that the interpolymer coating composition may be applied to the surface either as a single coating or, if so desired, the protective coating may be built-up by the application of several layers, each layer being permitted to harden by solvent evaporation before the next layer is applied. Furthermore, if so desired, protective coatings, or the interpolymeric composition, when obtained in the form of sheets, may be suitably pigmented.

Other uses for the interpolymeric compositions of the present invention reside in the fabrication of belting, hose, mountings, piston and pump-valves, sheet or valve disks, rolls, tubing, pressure-sensitive tape for electrical insulation purposes, grommets, or as adhesives for fastening a rubber surface to a metal or another rubber surface, and various uses as a dielectric medium.

Since certain changes may be made in carrying out the process of the present invention in producing the desired interpolymeric compositions without departing from the scope of the invention, it is intended that all matter contained in the above description is to be interpreted as illustrative and not in a limiting sense.

We claim:

1. A process for preparing a rubbery interpolymer which comprises polymerizing a monomeric mixture consisting of monomers totaling 100 mole percent of trifluorochloroethylene, vinylidene fluoride and a dissimilar polyfluoroolefin copolymerizable therewith, in which the trifluorochloroethylene and the vinylidene fluoride monomers are each present in an amount of at least 15 mole percent and said dissimilar polyfluoroolefin monomer containing from 2 to 7 carbon atoms is present in an amount of at least 5 mole percent.

2. A process for preparing a rubbery interpolymer which comprises polymerizing a monomeric mixture consisting of monomers totaling 100 mole percent of trifluorochloroethylene, vinylidene fluoride and a dissimilar polyfluoroolefin copolymerizable therewith, in which the trifluorochloroethylene monomer is present in an amount of at least 30 mole percent, the vinylidene fluoride monomer is present in an amount of at least 30 mole percent and said dissimilar polyfluoroolefin monomer containing from 2 to 7 carbon atoms is present in an amount of at least 10 mole percent.

3. A process for preparing a rubbery polymer which comprises polymerizing a monomeric mixture consisting of monomers totaling 100 mole percent of trifluorochloroethylene, vinylidene fluoride, and a dissimilar polyfluoroolefin copolymerizable therewith, in which the trifluorochloroethylene and the vinylidene fluoride monomers are each present in an amount of at least 15 mole percent and said dissimilar polyfluoroolefin monomer containing from 2 to 7 carbon atoms is present in an amount of at least 5 mole percent, in admixture with a free-radical polymerization promoter at a temperature between about −30° C. and about 150° C.

4. A process for preparing a rubbery interpolymer which comprises polymerizing a monomeric mixture consisting of monomers totaling 100 mole percent of trifluorochloroethylene, vinylidene fluoride and a dissimilar polyfluoroolefin copolymerizable therewith, in which the trifluorochloroethylene monomer is present in an amount of at least 30 mole percent, the vinylidene fluoride monomer is present in an amount of at least 30 mole percent and said dissimilar polyfluoroolefin monomer containing from 2 to 7 carbon atoms is present in an amount of at least 10 mole percent, in admixture with a free-radical polymerization promoter at a temperature between about −30° C. and about 150° C.

5. A process for preparing a rubbery interpolymer which comprises polymerizing a monomeric mixture consisting of monomers totaling 100 mole percent of trifluorochloroethylene, vinylidene fluoride and a dissimilar polyfluoroolefin copolymerizable therewith, in which the trifluorochloroethylene and the vinylidene fluoride monomers are each present in an amount of at least 15 mole percent and said dissimilar polyfluoroolefin monomer containing from 2 to 7 carbon atoms is present in an amount of at least 5 mole percent, in admixture with a polymerization promoter comprising a peroxy compound at a temperature between about −30° C. and about 150° C.

6. A process for preparing a rubbery interpolymer which comprises polymerizing a monomeric mixture consisting of monomers totaling 100 mole percent of trifluorochloroethylene, vinylidene fluoride and a dissimilar polyfluoroolefin copolymerizable therewith, in which the trifluorochloroethylene monomer is present in an amount of at least 30 mole percent, the vinylidene fluoride monomer is present in an amount of at least 30 mole percent and said dissimilar polyfluoroolefin monomer containing from 2 to 7 carbon atoms is present in an amount of at least 10 mole percent, in admixture with a polymerization promoter comprising a peroxy compound at a temperature between about −30° C. and about 150° C.

7. A process for preparing a rubbery interpolymer which comprises polymerizing a monomeric mixture consisting of monomers totaling 100 mole percent of trifluorochloroethylene, vinylidene fluoride and a dissimilar polyfluoroolefin copolymerizable therewith, in which the trifluorochloroethylene and the vinylidene fluoride monomers are each present in an amount of at least 15 mole percent and said dissimilar polyfluoroolefin monomer containing from 2 to 7 carbon atoms is present in an amount of at least 5 mole percent, in admixture with a polymerization promoter comprising an inorganic peroxy compound at a temperature between about 0° C. and about 75° C.

8. A process for preparing a rubbery interpolymer which comprises polymerizing a monomeric mixture consisting of monomers totaling 100 mole percent of trifluorochloroethylene, vinylidene fluoride and a dissimilar polyfluoroolefin copolymerizable therewith, in which the trifluorochloroethylene monomer is present in an amount of at least 30 mole percent, the vinylidene fluoride monomer is present in an amount of at least 30 mole percent and the other polyfluoroolefin monomer containing from 2 to 7 carbon atoms is present in an amount of at least 10 mole percent, in admixture with a polymerization promoter comprising an inorganic peroxy compound at a temperature between about 0° C. and about 75° C.

9. A process for preparing a rubbery interpolymer which comprises polymerizing a monomeric mixture consisting of monomers totaling 100 mole percent of trifluorochloroethylene, vinylidene fluoride and a dissimilar polyfluoroolefin copolymerizable therewith, in which the trifluorochloroethylene and the vinylidene fluoride monomers are each present in an amount of at least 15 mole percent and the other polyfluoroolefin monomer containing from 2 to 7 carbon atoms is present in an amount of at least 5 mole percent, in admixture with a polymerization promoter comprising an organic peroxy compound at a temperature between about −30° C. and about 150° C.

10. A process for preparing a rubbery interpolymer which comprises polymerizing a monomeric mixture consisting of monomers totaling 100 mole percent of trifluorochloroethylene, vinylidene fluoride and a dissimilar polyfluoroolefin copolymerizable therewith, in which the trifluorochloroethylene monomer is present in an amount of at least 30 mole percent, the vinylidene fluoride monomer is present in an amount of at least 30 mole percent and the other polyfluoroolefin monomer containing from 2 to 7 carbon atoms is present in an amount of at least 10 mole percent, in admixture with a polymerization promoter comprising an organic peroxy compound at a temperature between about −30° C. and about 150° C.

11. A rubbery interpolymer of a monomeric mixture consisting of monomers totaling 100 mole percent trifluorochloroethylene, vinylidene fluoride and a dissimilar polyfluoroolefin, in which the trifluorochloroethylene and the vinylidene fluoride monomers are each present in an amount of at least 15 mole percent and said dissimilar polyfluoroolefin monomer containing from 2 to 7 carbon atoms is present in an amount of at least 5 mole percent.

12. A rubbery interpolymer of a monomeric mixture consisting of monomers totaling 100 mole percent trifluorochloroethylene, vinylidene fluoride and a dissimilar polyfluoroolefin, in which the trifluorochloroethylene monomer is present in an amount of at least 30 mole percent, the vinylidene fluoride monomer is present in an amount of at least 30 mole percent and said dissimilar polyfluoroolefin monomer containing from 2 to 7 carbon atoms is present in an amount of at least 10 mole percent.

13. A rubbery interpolymer of a monomeric mixture consisting of monomers totaling 100 mole percent at least 15 mole percent trifluorochloroethylene, at least 15 mole percent vinylidene fluoride and at least 5 mole percent 1,1-chlorofluoroethylene.

14. A rubbery interpolymer of a monomeric mixture consisting of monomers totaling 100 mole percent at least 15 mole percent trifluorochloroethylene, at least 15 mole percent vinylidene fluoride and at least 5 mole percent trifluoroethylene.

15. A rubbery interpolymer of a monomeric mixture consisting of monomers totaling 100 mole percent at least 15 mole percent trifluorochloroethylene, at least 15 mole percent vinylidene fluoride and at least 5 mole percent perfluoropropene.

16. A rubbery interpolymer of a monomeric mixture consisting of monomers totaling 100 mole percent at least 15 mole percent trifluorochloroethylene, at least 15 mole percent vinylidene fluoride and at least 5 mole percent perfluoroisobutene.

17. A rubbery interpolymer of a monomeric mixture consisting of monomers totaling 100 mole percent at least 15 mole percent trifluorochloroethylene, at least 15 mole percent vinylidene fluoride and at least 5 mole percent tetrafluoroethylene.

References Cited in the file of this patent

UNITED STATES PATENTS

| | | |
|---|---|---|
| 2,468,054 | Ford | Apr. 26, 1949 |
| 2,479,367 | Joyce et al. | Aug. 16, 1949 |
| 2,549,935 | Sauer | Apr. 24, 1951 |
| 2,750,431 | Tarrant et al. | June 12, 1956 |
| 2,751,375 | Mantell et al. | June 19, 1956 |
| 2,751,376 | Barnhart | June 19, 1956 |
| 2,793,200 | West | May 21, 1957 |

FOREIGN PATENTS

| | | |
|---|---|---|
| 589,577 | Great Britain | June 24, 1947 |
| 608,807 | Great Britain | Sept. 21, 1948 |